(12) United States Patent
Kurabayashi

(10) Patent No.: US 6,790,878 B2
(45) Date of Patent: Sep. 14, 2004

(54) INK, INK SET, INK CARTRIDGE, RECORDING UNIT, IMAGE RECORDING PROCESS AND IMAGE RECORDING APPARATUS

(75) Inventor: Yutaka Kurabayashi, Murayama (JP)

(73) Assignee: Canon Kabushiki Kaisha, Tokyo (JP)

( * ) Notice: Subject to any disclaimer, the term of this patent is extended or adjusted under 35 U.S.C. 154(b) by 28 days.

(21) Appl. No.: 09/283,192

(22) Filed: Apr. 1, 1999

(65) Prior Publication Data

US 2002/0006982 A1 Jan. 17, 2002

(30) Foreign Application Priority Data

| Apr. 1, 1998 | (JP) | ............................................ 10-088690 |
| Apr. 1, 1998 | (JP) | ............................................ 10-088691 |
| Mar. 26, 1999 | (JP) | ............................................ 11-083598 |

(51) Int. Cl.$^7$ .............................. C09D 11/10; C08K 9/10
(52) U.S. Cl. ........................ 523/160; 523/161; 523/205; 106/31.28; 106/31.6
(58) Field of Search ................................ 523/160, 161, 523/205; 106/31.25, 31.26, 31.27, 31.28, 31.6

(56) References Cited

U.S. PATENT DOCUMENTS

| 5,376,169 A | * | 12/1994 | Hotomi et al. ............... 524/104 |
| 5,531,816 A | | 7/1996 | Wickramanayake ....... 106/20 R |
| 5,531,818 A | * | 7/1996 | Lin et al. ................... 106/31.28 |
| 5,622,548 A | * | 4/1997 | Zou et al. .................. 106/31.26 |
| 5,665,429 A | * | 9/1997 | Elwakil ........................ 427/418 |
| 5,803,959 A | * | 9/1998 | Johnson et al. ........... 106/31.75 |
| 5,851,274 A | * | 12/1998 | Lin ............................ 106/31.43 |
| 5,877,235 A | * | 3/1999 | Sakuma et al. ............. 523/161 |
| 5,879,439 A | * | 3/1999 | Nagai et al. .............. 106/31.28 |
| 5,886,065 A | * | 3/1999 | Tsang et al. ................ 523/161 |
| 5,886,091 A | * | 3/1999 | Harris et al. ................. 524/590 |
| 5,922,118 A | * | 7/1999 | Johnson et al. ............. 106/31.6 |
| 5,948,155 A | * | 9/1999 | Yui et al. .................. 106/31.58 |
| 5,961,704 A | * | 10/1999 | Nakamura et al. ....... 106/31.32 |
| 5,976,233 A | * | 11/1999 | Osumi et al. ............ 106/31.86 |
| 6,025,412 A | * | 2/2000 | Sacripante et al. ......... 523/161 |
| 6,031,019 A | * | 2/2000 | Tsutsumi et al. ........... 523/160 |

FOREIGN PATENT DOCUMENTS

| EP | 0 801 119 A1 | 10/1997 |
| JP | 61-59911 B2 | 5/1979 |
| JP | 61-59912 B2 | 5/1979 |
| JP | 61-59914 B2 | 2/1980 |
| JP | 3-172362 | 7/1991 |
| JP | 8-239610 | 9/1996 |
| JP | A-9-183931 | 7/1997 |
| JP | 9-183931 | 7/1997 |
| JP | A-9-227816 | 9/1997 |
| JP | 10-46074 | 2/1998 |
| WO | WO 96/36672 | 11/1996 |
| WO | WO 97/25384 | 7/1997 |

OTHER PUBLICATIONS

Derwent Abstract Accession No. 97–295171/27, (with respect to JP 09111168 A) (Xerox Corp.) Apr. 28, 1997.
Database WPI, Derwent Publications Ltd., AN 1983–749802, (with respect to JP 58–122973 of Jul. 7, 1983).

* cited by examiner

Primary Examiner—Callie Shosho
Assistant Examiner—Y. Middleton
(74) Attorney, Agent, or Firm—Fitzpatrick, Cella, Harper & Scinto

(57) ABSTRACT

Disclosed herein is an ink comprising a pigment and a resin encapsulating a coloring material. The ink can provide an image high in optical density and excellent in rub-off resistance, water fastness and resistance to line marker, and exhibits excellent ejection stability from a recording head when used in ink-jet recording.

18 Claims, 5 Drawing Sheets

MOVING DIRECTION OF CARRIAGE

INK, INK SET, INK CARTRIDGE, RECORDING UNIT, IMAGE RECORDING PROCESS AND IMAGE RECORDING APPARATUS

BACKGROUND OF THE INVENTION

1. Field of the Invention

The present invention relates to an ink which is suitable for use in ink-jet recording, excellent in reliability, and capable of providing an image having a high optical density even on plain paper and also forming an image having excellent water fastness and resistance to line marker, and an ink set, ink cartridge, recording unit, image recording apparatus and image recording process using such an ink. The present invention also relates to an ink which is suitable for use in ink-jet recording, excellent in reliability, capable of providing an image having a high optical density even on plain paper, forming an image having excellent water fastness and resistance and further extremely effectively preventing bleeding at boundaries between different colors of a multi-color image on a recording medium when the multi-color image is formed together with other color inks by an ink-jet recording method, and an ink set, ink cartridge, recording unit, image recording apparatus and image recording process using such an ink.

2. Related Background Art

An ink-jet recording method is a system in which recording is conducted by ejecting an ink to apply the ink to a recording medium such as paper. According to an ink-jet recording system disclosed in, for example, Japanese Patent Publication Nos. 61-59911, 61-59912 and 61-59914, in which an electrothermal converter is used as an ejection-energy supply means to apply thermal energy to an ink so as to generate bubbles, thereby ejecting the ink, the formation of a high-density multi-orifice in a recording head can be realized with ease, and a high-resolution and high-quality image can be recorded at high speed. Therefore, such an ink-jet system is a main system for ink-jet recording methods put to practical use at present.

By the way, for example, a water-soluble dye is used as a coloring material in an ink used in such an ink-jet recording method. However, images recorded with such an ink are required to more improve their water fastness, and resistance to line marker on plain paper.

When a multi-color printing is conducted on plain paper, there is also a demand for further reduction in the so-called color bleed caused by mixing of inks of different colors at boundaries between the inks in an image formed with such inks.

A great number of means for overcoming such problems, particularly, improving the optical density and water fastness of recorded images have been proposed to date. As one of the solutions thereof, it is proposed to prepare an ink containing a pigment as a coloring material and dispersed in water. For example, an ink using carbon black as a coloring material permits the provision of an image having a high optical density and excellent water fastness by ink-jet recording. However, such a recorded image still leaves room for improvement in rub-off resistance and resistance to line marker on plain paper in particular.

As a technique for overcoming such problems as described above, it has been known to improve image fixing ability by adding a resin in the ink. For example, Japanese Patent Application Laid-Open No. 3-172362 discloses a technique wherein a cationic emulsion, in which resin particles are dispersed as a fixing agent, is contained in an ink comprising a dye or pigment as a coloring material to improve the fixing ability of the ink on a recording medium. Japanese Patent Application Laid-Open No. 8-239610 discloses a water-based pigment composition for ink-jet, comprising a pigment, a colored resin and a humectant as essential components. It is also disclosed that a print excellent in both coloring ability and water fastness can be provided by such a composition.

SUMMARY OF THE INVENTION

According to the extensive study of the aforementioned prior art by the present inventor, since the upper limits of amounts of a pigment and a resin, which can be contained in an ink, are naturally defined when the ejection stability of the ink is taken into consideration, it is inevitable to choose the amount of the pigment, which affects the optical density of a recorded image, and the amount of the resin, which affects the image fixing ability of the ink, in terms of the balance between the trade-off characteristics, i.e., the optical density and the image fixing ability. Therefore, the present inventor has concluded that it cannot be yet said under the circumstances that the pigment inks proposed to date fully make the best use of merits obtained by using a pigment as a coloring material.

More specifically, Japanese Patent Application Laid-Open No. 8-239610 explains in the specification thereof that the colored resin is a dispersion of a resin colored by a dye. According to the preparation process of the colored resin described in the Example thereof, a dye is first added to an emulsion of a resin, and the mixture is heated to about 80° C. and then cooled, thereby preparing the colored resin. However, in page 4, left column, lines 38 to 41 of this patent specification, it is described that "In order for the dye to be sufficiently taken in the resin, the amount (of the dye) is preferably 10 parts or less, particularly 8 parts or less, per 100 parts of the resin". In each of the preparation processes described in Preparation Examples 8 to 13 of the specification, a mixing proportion of the dye to the solid resin content in the emulsion polymer is described as about 1:10 to 1:12 (dye:resin). According to the investigation by the present inventor, it has however been concluded that, when such a colored resin as described in Japanese Patent Application Laid-Open No. 8-239610 is used, such a proportion of the dye to the resin as described in the specification may not be said in some cases to be sufficient to compensate for a reduction in an optical density, due to a reduction of amount of a coloring material which can be contained in an ink, accompanied by the addition of the resin to the pigment ink for the purpose of improving the fixing ability of the ink to recording media. Further, it is inferred that when the colored resin is intended to added to such an extent that a sufficient optical density is achieved, the colored resin must be added in such an amount that departs from a range in which an ink-jet ink can be precisely ejected by an ink-jet recording system. As described above, from the investigations as to the prior art, the present inventor has reached a conclusion that the development of a new technique entirely different from the conventional techniques is required for further improvements in optical density and image fixing ability in pigment inks.

Therefore, the present inventor has carried out a further investigation. As a result, a technique which can solve the problems on inks containing a pigment while making the best use of the merits obtained by using the pigment as a coloring material has been found, thus leading to completion of the present invention. Similarly, as the result of the investigation by the present inventors, a technique which can solve the problems on inks containing a pigment while making the best use of the merits obtained by using the pigment as a coloring material, and extremely effectively prevent bleeding when applied to multi-color printing has also been found, thus leading to completion of the present invention.

It is an object of the present invention to provide an ink which can provide an image high in optical density and excellent in rub-off resistance, water fastness and resistance to line marker, and exhibits excellent ejection stability from a recording head when used in ink-jet recording.

Another object of the present invention is to provide an ink which can provide an image high in optical density and excellent in rub-off resistance, water fastness and resistance to line marker, has excellent ejection stability from a recording head when used in ink-jet recording, and moreover can extremely effectively reduce bleeding when used in a multi-color printing.

A further object of the present invention is to provide an image recording process which can form an image high in optical density and excellent in rub-off resistance, water fastness and resistance to line marker.

A still further object of the present invention is to provide a multi-color image recording process which can form an image high in optical density and excellent in rub-off resistance, water fastness and resistance to line marker and moreover can extremely effectively reduce bleeding on a recording medium.

A yet still further object of the present invention is to provide an image recording apparatus which can be used in the stable formation of an image high in optical density and excellent in rub-off resistance, water fastness and resistance to line marker, and an ink set, an ink cartridge and a recording unit which can be used in such an image recording apparatus.

A yet still further object of the present invention is to provide an image recording apparatus which can be used in the stable formation of a multi-color image high in optical density, excellent in rub-off resistance, water fastness and resistance to line marker and extremely little in occurrence of bleeding, and an ink set, an ink cartridge and a recording unit which can be used in such an image recording apparatus.

The above objects can be achieved by the present invention described below.

In one embodiment of the present invention, there is thus provided an ink comprising a pigment and a resin encapsulating a coloring material.

Such an ink can provide a high-quality image high in optical density and excellent in rub-off resistance, water fastness and resistance to line marker by ink-jet recording, and is excellent in reliability (ejection durability, ejection stability, anti-clogging property, etc.) upon ink-jet recording.

In another embodiment of the present invention, there is provided an ink cartridge, comprising an ink container containing an ink, which comprises a pigment and a resin encapsulating a coloring material.

In a further embodiment of the present invention, there is provided a recording unit, comprising an ink container containing an ink, which comprises a pigment and a resin encapsulating a coloring material, a recording head and a means for feeding the ink from the ink container to the recording head.

In a still further embodiment of the present invention, there is provided an ink set comprising a first ink and a second ink in combination, wherein the first ink comprises a pigment and a resin encapsulating a coloring material, and each of the first and second inks has a color selected from the group consisting of yellow, magenta, cyan, black, red, green and blue.

In a yet still further embodiment of the present invention, there is provided an image recording process, comprising the step of applying an ink, which comprises a pigment and a resin encapsulating a coloring material, to a recording medium.

In a yet still further embodiment of the present invention, there is provided an image recording apparatus, comprising a recording unit which has an ink container containing an ink, which comprises a pigment and a resin encapsulating a coloring material, a recording head and a means for feeding the ink from the ink container to the recording head, and a means for actuating the recording unit to eject the ink from the recording head.

The above embodiments are adopted, thereby bringing about an effect that a high-quality image high in optical density and excellent in rub-off resistance, water fastness and resistance to line marker is provided by ink-jet recording.

In one embodiment of the present invention, there is provided an ink comprising either a pigment having a cationic group, or a pigment and a pigment dispersant having a cationic group, and a resin encapsulating a coloring material.

Such an ink can provide a high-quality image high in optical density and excellent in water fastness, resistance to line marker and rub-off resistance by ink-jet recording.

When a self-dispersing carbon black to the surface of which at least one cationic hydrophilic group is bonded directly or through another group is used as the pigment, the amount of a pigment dispersant or the like to be added into an ink can be reduced, or there need not add such a dispersant. As a result, reliability (ejection durability, ejection stability, anti-clogging property, etc.) upon ink-jet recording is also more improved in addition to the above-described effect.

In another embodiment of the present invention, there is provided an ink cartridge, comprising an ink container containing an ink, which comprises either a pigment having a cationic group, or a pigment and a pigment dispersant having a cationic group, and a resin encapsulating a coloring material.

In a further embodiment of the present invention, there is provided a recording unit, comprising an ink container containing an ink, which comprises either a pigment having a cationic group, or a pigment and a pigment dispersant having a cationic group, and a resin encapsulating a coloring material, a recording head and a means for feeding the ink from the ink container to the recording head.

In a still further embodiment of the present invention, there is provided an ink set comprising a first ink and a second ink in combination, wherein the first ink comprises either a pigment having a cationic group, or a pigment and a pigment dispersant having a cationic group, and a resin encapsulating a coloring material, and each of the first and second inks has a color selected from the group consisting of yellow, magenta, cyan, black, red, green and blue.

In a yet still further embodiment of the present invention, there is provided an image recording process, comprising the step of applying an ink, which comprises either a pigment having a cationic group, or a pigment and a pigment dispersant having a cationic group, and a resin encapsulating a coloring material, to a recording medium.

According to such an image recording process, there is brought about an effect that a high-quality image high in optical density and excellent in water fastness, resistance to line marker and rub-off resistance can be provided by ink-jet recording.

In a yet still further embodiment of the present invention, there is provided an image recording process, comprising the step of applying at least two color inks to a recording medium using an ink-jet recording method to form a multi-color image, wherein one ink comprises either a pigment having a cationic group, or a pigment and a pigment dispersant having a cationic group, and a resin encapsulating a coloring material, and the other ink comprises a compound having an anionic compound.

According to such an image recording process, a high-quality image high in optical density and excellent in water fastness, resistance to line marker and rub-off resistance can be provided by ink-jet recording, and a high-quality, multi-color image, which is reduced in occurrence of bleeding, can be formed by ink-jet recording.

In a yet still further embodiment of the present invention, there is provided an image recording apparatus, comprising a recording unit which has an ink container an ink, which comprises either a pigment having a cationic group, or a pigment and a pigment dispersant having a cationic group, and a resin encapsulating a coloring material, a recording head and a means for feeding the ink from the ink container to the recording head, and a means for actuating the recording unit to eject the ink from the recording head.

In a yet still further embodiment of the present invention, there is provided an image recording apparatus, comprising a recording unit which has ink containers containing first and second inks respectively, a recording head and a means for feeding the inks from the ink containers to the recording head, and a means for actuating the recording unit to eject the respective inks from the recording head, wherein the first ink comprises either a pigment having a cationic group, or a pigment and a pigment dispersant having a cationic group, and a resin encapsulating a coloring material, and the second ink is an anionic ink.

According to such an image recording apparatus, a high-quality image high in optical density and excellent in water fastness, resistance to line marker and rub-off resistance can be provided by ink-jet recording, and a high-quality, multi-color image, which is reduced in occurrence of bleeding, can be formed by ink-jet recording.

DESCRIPTION OF THE PREFERRED EMBODIMENTS

Figure 1:
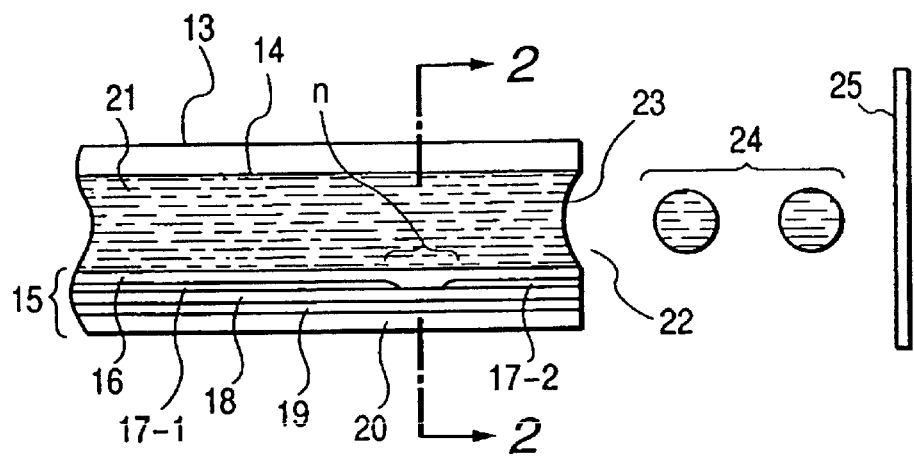
FIG. 1 is a longitudinal cross-sectional view of a head of an ink-jet recording apparatus according to an embodiment.

The ink according to the first embodiment of the present invention comprises a pigment and a resin encapsulating a coloring material. The respective requirements for components will hereinafter be described in the following order:

(1) a resin encapsulating a coloring material;
(2) a pigment;
(3) an aqueous medium, other additives, etc.; and
(4) a recording apparatus, recording process, etc.

(1) Resin Encapsulating a Coloring Material:

The resin encapsulating a coloring material will hereinafter be described.

As examples of the resin encapsulating a coloring material, may be mentioned a resin with a coloring material encapsulated in a microcapsule made of the resin, and a resin emulsion with a dye or pigment, which has been dispersed or dispersed in an oily solvent, dispersed in an aqueous medium. However, the microcapsulized resin encapsulating the coloring material is particularly preferred.

More specifically, in the case where a hydrophobic coloring material, for example, an oil color or a pigment, is used as the coloring material, it is considered that since the coloring material and the hydrophobic moiety of the resin are easy to interact with each other by the microcapsulization, the hydrophobic moiety of the resin becomes hard to be oriented toward a water system. As a result, it is expected that when an ink-jet ink comprising such a resin encapsulating the coloring material is ejected from an ink-jet printer, the resin is prevented from depositing to and accumulating on the nozzle-formed surface of an ink-jet head subjected to a water-repellent treatment, and so such a resin contributes to a further improvement in the ejection stability of the ink over a long period of time.

The resin with the coloring material microcapsulized therein is a resin dispersion obtained by dissolving or dispersing the coloring material in an oily solvent, emulsifying and dispersing the solution or dispersion thus obtained in water and then microcapsulizing the resultant emulsion by a proper method conventionally known.

As the coloring material, there may preferably be used a water-insoluble coloring material, for example, a pigment or oil-soluble dye. Namely, the water-insoluble coloring material is easy to prepare the resin with the coloring material microcapsulized therein. Specifically, carbon black or the like may be used as a pigment for black (Bk). As the carbon black, may preferably be used ones which are produced in accordance with the furnace process or channel process and have such properties that the primary particle diameter is from 15 to 40 nm, the specific surface area is from 50 to 300 $m^2/g$ as measured by the BET method, the oil absorption is from 40 to 150 ml/100 g as determined by using DBP, the volatile matter is from 0.5 to 10%, and the pH is from 2 to 9. Examples of commercially-available carbon black having such properties include No. 2300, No. 900, MCF88, No. 33, No. 40, No. 45, No. 52, MA7, MA8 and No. 2200B (all, products of Mitsubishi Chemical Industries Limited), RAVEN 1255 (product of Columbian Carbon Japan Limited), REGAL 400R, REGAL 330R, REGAL 660R and MOGUL L (all, products of CABOT Co.), and Color Black FW-1, Color Black FW18, Color Black S170, Color Black S150, Printex 35 and Printex U (all, products of Degussa AG).

As the oil-soluble dye, may preferably be used the following dyes:

C.I. Solvent Yellow 1, 2, 3, 13, 19, 22, 29, 36, 37, 38, 39, 40, 43, 44, 45, 47, 62, 63, 71, 76, 81, 85 and 86;

C.I. Solvent Red 8, 27, 35, 36, 37, 38, 39, 40, 58, 60, 65, 69, 81, 86, 89, 91, 92, 97, 99, 100, 109, 118, 119 and 122;

C.I. Solvent Blue 14, 24, 26, 34, 37, 38, 39, 42, 43, 45, 48, 52, 53, 55, 59 and 67; and C.I. Solvent Black 3, 5, 7, 8, 14, 17, 19, 20, 22, 24, 26, 27, 28, 29, 43 and 45.

Various kinds of conventionally known water-soluble dyes may also be used so far as the counter ions thereof (usually, sodium, potassium or ammonium ion) are replaced by an organic amine or the like.

It is preferred that a coloring material having the same color tone as the pigment, which will be described subsequently, be selected from among the various kinds of coloring materials described above in order to, for example, adjust or compensate for the color tone of the pigment. The optical density of the resulting recorded image can be thereby further enhanced. For example, when carbon black is used as the pigment as will be described subsequently, it is preferred that carbon black be also used as the coloring material. Two or more coloring materials may be used as the coloring material encapsulated in the resin.

In this case, the respective coloring materials may be encapsulated in either different resins or a resin in common with the coloring materials.

A process for preparing the resin with the coloring material encapsulated in a microcapsule in the resin as the resin encapsulating the coloring material will hereinafter be described.

The coloring material is first dissolved or dispersed in an oily solvent, and the oily solvent is then emulsified and dispersed in water. Examples of a method for emulsifying and dispersing the oily solvent with the coloring material dissolved or dispersed therein in water, may be mentioned a dispersion method by ultrasonic wave and methods using various kinds of dispersing machines or stirring machines. At this time, various kinds of emulsifiers and/or dispersants, and moreover emulsification or dispersion aids such as protective colloid may also be used as needed.

As these emulsifiers and dispersion aids, there may be used polymeric substances such as PVA, PVP and gum arabic, and besides anionic surfactants, nonionic surfactants and the like. Examples of a method for microcapsulizing the above emulsion include a method in which the coloring material and the resin are dissolved in a water-insoluble organic solvent (oily solvent), and the solution is subjected to phase inversion into a water system, thereby conducting phase-inversion emulsification, an interfacial polymerization method in which a polymerization reaction is caused at an interface between an organic phase and an aqueous phase to conduct microcapsulization, the so-called in-situ polymerization method in which a material capable of forming a wall to an organic phase alone is dissolved or co-existed, thereby forming microcapsules, and a coacervation method in which the pH, temperature, concentration and the like of an aqueous solution of a polymer are changed, thereby phase-separating a concentrated phase of the polymer to form microcapsules. After the formation of microcapsules, a step of removing the oily solvent is added. The average particle diameter of the resin encapsulating the coloring material obtained in the above-described manner is preferably within a range of from 0.01 to 2.0 µm, more preferably from 0.05 to 1 µm.

In this embodiment, examples of the resin include polymers of a monomer as a hydrophilic functional group and a monomer as a hydrophobic functional group, and salts thereof. Examples of monomers having anionic hydrophilic group generally include sulfonic acid type monomers and carboxylic acid type monomers. Examples of the sulfonic acid type monomers include styrenesulfonic acid and salts thereof, and vinylsulfonic acid and salts thereof. Examples of the carboxylic acid type monomers include $\alpha,\beta$-ethylenically unsaturated carboxylic acids, $\alpha,\beta$-ethylenically unsaturated carboxylic acid derivatives, acrylic acid, acrylic acid derivatives, methacrylic acid, methacrylic acid derivatives, maleic acid, maleic acid derivatives, itaconic acid, itaconic acid derivatives, fumaric acid and fumaric acid derivatives. Examples of the monomer as the hydrophobic component include styrene, styrene derivatives, vinyltoluene, vinyltoluene derivatives, vinylnaphthalene, vinylnaphthalene derivatives, butadiene, butadiene derivatives, isoprene, isoprene derivatives, ethylene, ethylene derivatives, propylene, propylene derivatives, alkyl acrylates and alkyl methacrylates.

Examples of the salts of the polymers include onium compounds with an alkali metal, ammonium ion, organic ammonium ion, phosphonium ion, sulfonium ion, oxonium ion, stibonium ion, stannonium ion or iodonium ion. To the above polymers and salts thereof, may be suitably added a polyoxyethylene group, hydroxyl group, acrylamide, acrylamide derivative, dimethylaminoethyl methacrylate, ethoxyethyl methacrylate, butoxyethyl methacrylate, ethoxytriethylene methacrylate, methoxypolyethylene glycol methacrylate, vinylpyrrolidone, vinylpyridine, vinyl alcohol, alkyl ether and the like.

(2) Pigment:

As the pigment, the conventionally known pigments, for example, carbon black and organic pigments, may be used without any problem. In the case where a black ink is prepared, it is preferred to use a self-dispersing carbon black to the surface of which at least one hydrophilic group is bonded directly or through another atomic group. More specifically, when the self-dispersing carbon black is used, there need not add a dispersant for dispersing a pigment in an ink, or its amount added can be reduced to a great extent. As the dispersant, there may be used a conventionally known water-soluble polymer or the like. However, such a polymer may deposit on the ink-ejection opening face of an ink-jet recording head in some cases to lower the ejection stability of the ink.

When such the self-dispersing carbon black as described above is used as the pigment, however, the content of such a polymer can be made zero or reduced to a great extent. As a result, the ejection stability of the resulting ink upon ink-jet recording can be further improved.

The self-dispersing carbon black will hereinafter be described in detail. The self-dispersing carbon black preferably has an ionicity, and, for example, those anionically charged may be preferably used.

Examples of the carbon black anionically charged include those obtained by bonding, for example, any of such hydrophilic groups:

—$COO(M2)$, —$SO_3(M2)$, -$PO_3H(M2)$ and -$PO_3(M2)_2$ to the furface of carbon black.

In the above formulae, M2 is hydrogen, alkali metal, ammonium or organic ammonium. Of these, carbon black anionically charged by bonding —$COO(M2)$ or —$SO_3(M2)$ to the surface thereof is particularly preferably used in this embodiment, since its dispersibility in the ink is good. Of those represented by "M2" in the above-described hydrophilic groups, specific examples of the alkali metal include Li, Na, K, Rb and Cs, and specific examples of the organic ammonium include methylammonium, dimethylammonium, trimethyl-ammonium, ethylammonium, diethylammonium, triethyl-ammonium, methanol ammonium, dimethanol ammonium and trimethanol ammonium. As an example of a method for preparing the anionically charged self-dispersing carbon black may be mentioned a method in which carbon black is subjected to an oxidation treatment with sodium hypochlorite. According to this method, a —COONa group can be chemically bonded to the surface of carbon black.

(3) Aqueous Medium, Other Additives, etc.:

The resin encapsulating the coloring material and the pigment are held in a dispersed state by an aqueous medium to constitute the ink. The aqueous medium preferably contain at least water as a component. It is preferred that a proportion of water accounted for in the ink be, for example, 20 to 95% by weight, particularly 40 to 95% by weight, more particularly 60 to 95% by weight based on the total weight of the ink.

At least one water-soluble organic solvent may be contained in the aqueous medium. Examples of water-soluble organic solvents preferably used include alkyl alcohols having 1 to 4 carbon atoms, such as methyl alcohol, ethyl alcohol, n-propyl alcohol, isopropyl alcohol, n-butyl alcohol, sec-butyl alcohol and tert-butyl alcohol; ketones and ketone alcohols such as acetone and diacetone alcohol; amides such as dimethylformamide and dimethylacetamide; ethers such as tetrahydrofuran and dioxane; polyalkylene glycols such as polyethylene glycol and polypropylene glycol; alkylene glycols the alkylene moiety of which has 2 to 6 carbon atoms, such as ethylene glycol, propylene glycol, butylene glycol, triethylene glycol, thiodiglycol, hexylene glycol and diethylene glycol; 1,2,6-hexanetriol; glycerol; alkyl ethers of polyhydric alcohols, such as ethylene glycol methyl ether, ethylene glycol ethyl ether, triethylene glycol monomethyl and triethylene glycol monoethyl ether; N-methyl-2-pyrrolidone; 2-pyrrolidone; and 1,3-dimethyl-2-imidazolidinone. The total content of the water-soluble organic solvents in the ink is within a range of from 2 to 60% by weight, preferably from 5 to 25% by weight based on the total weight of the ink.

A preferred water-soluble organic solvent is glycerol, and its amount added is preferably 2 to 30% by weight, more preferably 5 to 15% by weight based on the total weight of the ink. A more preferred water-soluble organic solvent is a mixed solvent comprising glycerol and another polyhydric alcohol (for example, diethylene glycol, ethylene glycol or the like). The mixing ratio of glycerol to said another polyhydric alcohol is preferably within a range of from 10:5 to 10:50. Examples of the polyhydric alcohol another than glycerol include diethylene glycol, ethylene glycol, polyethylene glycol and propylene glycol. Further, these glycerol and mixed solvent of glycerol and another polyhydric alcohol may be used in combination with other water-soluble organic solvents.

The inks according to this embodiment are suitably used in ink-jet recording method in which an ink is ejected from a recording head by thermal energy or mechanical energy to apply it to a recording medium, thereby recording an image. When the inks according to this embodiment are made particularly suitable for use in ink-jet recording, the inks are controlled so as to have, as their own physical properties as measured at 25° C., a surface tension of 15 to 60 dyn/cm, preferably 20 to 50 dyn/cm, a viscosity of 15 cP or lower, particularly 10 cP or lower, more particularly 5 cP or lower and a pH within a range of preferably from 3 to 11, more preferably from 3.5 to 8. As specific ink compositions capable of achieving such properties, may be mentioned, for example, the compositions of various inks used in Examples which will be described subsequently.

Incidentally, to the inks according to this embodiment, may be added various kinds of additives such as surfactants, pH adjusters and mildewproofing agents in addition to the resin encapsulating the coloring material obtained in the above-described manner and the pigment.

No particular limitation is imposed on recording media used in a recording process using the inks according to this embodiment, and examples thereof include various kinds of plain paper such as paper for copying and bond paper, coated paper specially prepared for ink-jet recording, glossy paper, and OHP films.

The ink according to the second embodiment of the present invention comprises either a pigment having a cationic group, or a pigment and a pigment dispersant having a cationic group, and a resin encapsulating a coloring material.

The respective requirement for components of this embodiment will hereinafter be described in the following order:

(4) a resin having a cationic group and encapsulating a coloring material;

(5) a pigment dispersion in which a pigment or a pigment dispersant has a cationic group; and (6) an aqueous medium, other additives, etc.

(4) Resin Having a Cationic Group and Encapsulating a Coloring Material:

The resin encapsulating a coloring material will hereinafter be described.

Examples of the resin encapsulating a coloring material include a resin with a coloring material encapsulated in a microcapsule of the resin, and an aqueous dispersion of a resin having a cationic group, wherein the resin encapsulates a coloring material by emulsifying a dye or pigment dissolved or dispersed in an oily solvent. Of these, the resin with the coloring material encapsulated in a microcapsule of the resin is particularly preferred.

The resin with the coloring material encapsulated in a microcapsule of the resin is a resin dispersion obtained by dissolving or dispersing the coloring material in an oily solvent, emulsifying and dispersing the solution or dispersion thus obtained in water and then microcapsulizing the resultant emulsion by a proper method conventionally known.

As the coloring material, there may be used any of those described in the above requirement (1).

A process for preparing the resin with the coloring material encapsulated in the microcapsule of the resin as the resin encapsulating the coloring material will hereinafter be described.

The coloring material is first dissolved or dispersed in an oily solvent, and the oily solvent is then emulsified and dispersed in water. Examples of a method for emulsifying and dispersing the oily solvent with the coloring material dissolved or dispersed therein, may be mentioned a dispersion method by ultrasonic wave and methods using various kinds of dispersing machines or stirring machines. At this time, various kinds of emulsifiers and/or dispersants, and moreover emulsification or dispersion aids such as protective colloid may also be used as needed. As these emulsifiers and dispersion aids, there may be used polymeric substances such as PVA, PVP and gum arabic, and besides anionic surfactants, nonionic surfactants and the like. Examples of a method for microcapsulizing the above emulsion include a method in which the coloring material and the resin are dissolved in a water-insoluble organic solvent (oily solvent), and the solution is subjected to phase inversion into a water system, thereby conducting phase-inversion emulsification, an interfacial polymerization method in which a polymerization reaction is caused at an interface between an organic phase and an aqueous phase to conduct microcapsulization, the so-called in-situ polymerization method in which a material capable of forming a wall to an organic phase alone is dissolved or co-existed, thereby forming microcapsules, and a coacervation method in which the pH, temperature, concentration and the like of an aqueous solution of a polymer are changed, thereby phase-separating a concentrated phase of the polymer to form microcapsules. After the formation of microcapsules, a step of removing the oily solvent is added. The average particle diameter of the resin encapsulating the coloring material obtained in the above-described manner is preferably within a range of from 0.01 to 2.0 μm, more preferably from 0.05 to 1 μm.

Examples of the cationic group in the resin which encapsulates the coloring material include N,N-dimethyl-aminoethyl methacrylate [$CH_2=C(CH_3).COO.C_2H_4N(CH_3)_2$], N,N-dimethylaminoethyl acrylate [$CH_2=CH.COO.C_2H_4N(CH_3)_2$], N,N-dimethylaminopropyl methacrylate [$CH_2=C(CH_3).COO.C_3H_6N-(CH_3)_2$], N,N-dimethylaminopropyl acrylate [$CH_2=CH.COO.C_3H_6N(CH_3)_2$], N,N-dimethylacrylamide [$CH_2=CH.CON(CH_3)_2$], N,N-dimethylmethacrylamide [$CH_2=C(CH_3).CON(CH_3)_2$], N,N-dimethylaminoethyl acrylamide [$CH_2=CH.CONHC_2H_4N(CH_3)_2$], N,N-dimethylaminoethyl methacrylamide [$CH_2=C(CH_3).CONH-C_2H_4N(CH_3)_2$], N,N-dimethylaminopropyl acrylamide [$CH_2=CH.CONHC_3H_6N(CH_3)_2$] and N,N-dimethylaminopropyl methacrylamide [$CH_2=C(CH_3).CONHC_3H_6N(CH_3)_2$].

In the case of a tertiary amine, examples of a compound for forming a salt include hydrochloric acid, sulfuric acid and acetic acid. Examples of a compound used in quaternization include methyl chloride, dimethylsulfuric acid, benzyl chloride and epichlorohydrin.

(5) Pigment:

As the pigment according to this embodiment, the conventionally known carbon black and organic pigments may be used without any problem. However, particularly preferred is a self-dispersing carbon black to the surface of which at least one cationic hydrophilic group is bonded directly or through another atomic group.

Specific examples thereof will hereinafter be described.

(Cationically Charged Carbon Black)

Examples of cationically charged carbon black include those obtained by bonding at least one selected from among the following quaternary ammonium groups to the surface of carbon black.

—$SO_2N^+H_3$, —$SO_2N^+H_2COR$, —$N^+H_3$, —$N^+R_3$,

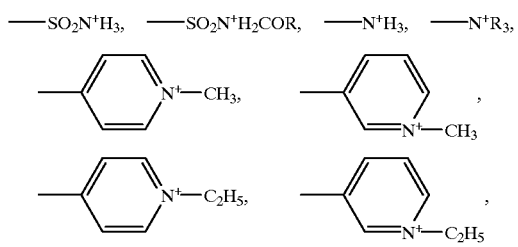

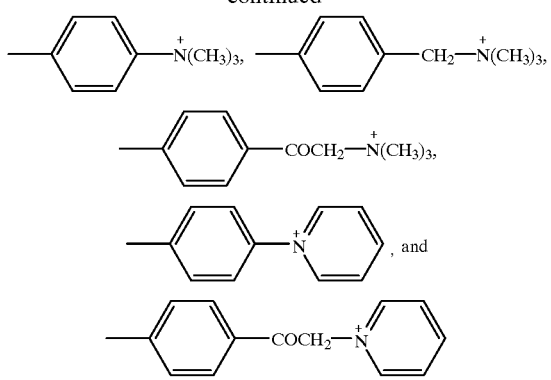

In the above formulae, R is a straight or branched alkyl group having 1 to 12 carbon atoms, a substituted or unsubstituted phenyl group or a substituted or unsubstituted naphthyl group.

As an example of a method for producing the self-dispersing carbon black cationically charged by bonding such a hydrophilic group as described above, is described a method for bonding, for example, an N-ethylpyridyl group of the structure

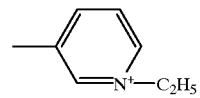

to the surface of carbon black.

Namely, there is mentioned a method in which carbon black is treated with 3-amino-N-ethylpyridinium bromide. The self-dispersing carbon black cationically charged by introducing the hydrophilic group into the surface of carbon black in this manner keeps a stably dispersed state even when it is contained in a water-based ink without adding any dispersant or the like, since it has good dispersibility in water by virtue of repulsion of the ion thereof.

Such various hydrophilic groups as described above may be bonded directly to the surface of carbon black. Alternatively, another atomic group may be intervened between the surface of carbon black and the hydrophilic group to bond the hydrophilic group indirectly to the surface of carbon black. Specific examples of said another atomic group include linear or branched alkylene groups having 1 to 12 carbon atoms, a substituted or unsubstituted phenylene group and a substituted or unsubstituted naphthylene group. Examples of substituent groups on the phenylene and naphthylene groups include linear or branched alkyl groups having 1 to 6 carbon atoms. Specific examples of combinations of said another group and the hydrophilic group include —$C_2H_4$—COOM, -Ph-$SO_3$M, Ph-COOM and —$C_5H_{10}$—$NH_3^+$, wherein Ph is a phenyl group.

In this embodiment, two or more of the self-dispersing carbon black described above may be suitably selected and used as a coloring material for the ink. The amount of the self-dispersing carbon black to be added in the ink is preferably within a range of from 0.1 to 15% by weight, particularly from 1 to 10% by weight, based on the total weight of the ink. When the self-dispersing carbon black is added in this range, its satisfactory dispersion state can be kept in the ink.

In this embodiment, not only the self-dispersing carbon black having a cationic group but also a pigment dispersion in which the conventionally known carbon black as described above is dispersed by a dispersant having a cationic group may be used. The term "a pigment dispersant" herein used means "a dispersant for dispersing a pigment". Examples of the dispersant having a cationic group include those obtained by polymerization of vinyl monomers. Examples of a cationic monomer constituting at least a part of the polymers obtained include salts of a tertiary amine monomer and quaternized compounds thereof. Examples of such compounds include N,N-dimethylaminoethyl methacrylate $[CH_2=C(CH_3).COO.C_2H_4N(CH_3)_2]$, N,N-dimethylaminoethyl acrylate $[CH_2=CH.COO.C_2H_4N(CH_3)_2]$, N,N-dimethylaminopropyl methacrylate $[CH_2=C(CH_3).COO.C_3H_6N(CH_3)_2]$, N,N-dimethyl-aminopropyl acrylate $[CH_2=CH.COO.C_3H_6N(CH_3)_2]$, N,N-dimethylacrylamide $[CH_2=CH.CON(CH_3)_2]$, N,N-dimethyl-methacrylamide $[CH_2=C(CH_3).CON(CH_3)_2]$, N,N-dimethyl-aminoethyl acrylamide $[CH_2=CH.CONHC_2H_4N(CH_3)_2]$, N,N-dimethylaminoethyl methacrylamide $[CH_2=C(CH_3).CONH—C_2H_4N(CH_3)_2]$, N,N-dimethylaminopropyl acrylamide $[CH_2=CH.CONHC_3H_6N(CH_3)_2]$ and N,N-dimethylaminopropyl methacrylamide $[CH_2=C(CH_3).CONHC_3H_6N(CH_3)_2]$. In the case of a tertiary amine, examples of a compound for forming a salt include hydrochloric acid, sulfuric acid and acetic acid. Examples of a compound used in quaternization include methyl chloride, dimethylsulfuric acid, benzyl chloride and epichlorohydrin. Of these, methyl chloride and dimethylsulfuric acid are preferred from the view point of the preparation of the dispersant used in this embodiment. Such tertiary amine salts and quaternary ammonium compounds as described above act as cations in water, and they are stably soluble in an acidic region under neutralized conditions. The content of these monomers in their corresponding copolymers is preferably within a range of from 20 to 60% by weight.

Examples of other monomers used for constituting the above-described cationic polymer dispersants include acrylic esters having a hydroxyl group, such as 2-hydroxyethyl methacrylate and acrylic esters having a long ethylene oxide chain at their side chains, hydrophobic monomers such as styrenic monomers, and water-soluble monomers soluble in water at about pH 7, such as acrylamide and derivatives thereof, vinyl ether and derivatives thereof, vinylpyrrolidone and derivatives thereof, vinylpyridine and derivatives thereof, and vinyloxazoline and derivatives thereof. Examples of the hydrophobic monomers used include styrene, styrene derivatives, vinylnaphthalene, vinylnaphthalene derivatives, alkyl esters of (meth)acrylic acid and acrylonitrile. In the polymer dispersant obtained by copolymerization, it is preferred that the water-soluble monomer be used in a range of from 15 to 35% by weight in order to stabilize the copolymer in an aqueous solution, while the hydrophobic monomer be used in a range of from 20 to 40% by weight in order to enhance the dispersing effect of the copolymer on the pigment.

Upon use of the above-described cationic water-soluble polymer as a dispersant to disperse a pigment, it is preferred from the viewpoint of physical properties that the pigment be a pigment adjusted so as to have an isoelectric point of at least 6, or such a pigment that the pH of a simple aqueous dispersion which characterizes the pigment is neutral or basic, for example, from 7 to 10. It is understood that such a pigment is preferred from the viewpoint of dispersibility due to the fact that the ionic interaction between the pigment and the cationic water-soluble polymer becomes strong.

In order to obtain a fine particulate aqueous dispersion of a pigment using such a material as described above, for example, carbon black is premixed in a solution of the cationic dispersant and subsequently milled in a dispersing machine at a high shear rate. After diluted, the mixture is centrifuged to remove coarse particles from the dilute mixture. Thereafter, materials necessary for achieving the desired ink formulation are added, and the resulting mixture is aged if circumstances require. Thereafter, the thus-treated mixture is finally centrifuged to obtain a pigment dispersion having the desired average particle diameter, whereby an aqueous dispersion of carbon black can be obtained. The pH of the ink thus prepared is preferably adjusted to a range of from 3 to 7.

(6) Aqueous Medium, Other Additives, etc.:

As an aqueous medium for holding the resin having a cationic group and encapsulating the coloring material, as described in the requirement (4), and the cationic pigment or the pigment dispersion containing the pigment dispersant having a cationic group described in the requirement (5) in a dispersed state to constitute the ink, that described in the composing requirement (3) may be suitably used. It is preferred that a proportion of water accounted for in the ink be, for example, 20 to 95% by weight, particularly 40 to 95% by weight, more particularly 60 to 95% by weight based on the total weight of the ink. As a water-soluble organic solvent, which may be added to the aqueous medium, that mentioned in the composing requirement (3) may also be used. A preferred water-soluble organic solvent is glycerol, and its amount added is preferably 2 to 30% by weight, more preferably 5 to 15% by weight based on the total weight of the ink. A more preferred water-soluble organic solvent is a mixed solvent comprising glycerol and another polyhydric alcohol such as diethylene glycol or ethylene glycol. The mixing ratio of glycerol to said another polyhydric alcohol is preferably within a range of from 10:5 to 10:50. Examples of the polyhydric alcohol another than glycerol include diethylene glycol, ethylene glycol, polyethylene glycol and propylene glycol. Further, these glycerol and mixed solvent of glycerol and another polyhydric alcohol may be used in combination with other water-soluble organic solvents.

The inks according to this embodiment are suitably used in ink-jet recording method in which an ink is ejected from a recording head by thermal energy or mechanical energy to apply it to a recording medium, thereby recording an image. When the inks according to this embodiment are made particularly suitable for use in ink-jet recording, the inks are controlled so as to have, as their own physical properties as measured at 25° C., a surface tension of 15 to 60 dyn/cm, preferably 20 to 50 dyn/cm, a viscosity of 15 cP or lower, particularly 10 cP or lower, more particularly 5 cP or lower and a pH within a range of preferably from 3 to 11, more preferably from 3.5 to 8.

As specific ink compositions capable of achieving such properties, may be mentioned, for example, the compositions of various inks used in Examples which will be described subsequently.

To the inks according to this embodiment, may be further added various kinds of additives such as surfactants, pH adjusters and mildewproofing agents in addition to the resin encapsulating the coloring material obtained in the above described manner and the pigment.

No particular limitation is imposed on recording media used in a recording method using the inks according to this embodiment, and various kinds of plain paper such as paper for copying and bond paper, coated paper specially prepared for ink-jet recording, glossy paper, and OHP films are suitably used.

(7) Recording Apparatus, Recording Process, etc.:

An image recording apparatus suitable for use in recording with the above-described inks according to the first or second embodiment on a recording medium, and an image recording process using it will hereinafter be described. As an example of the image recording apparatus, may be mentioned an apparatus in which thermal energy corresponding to recording signals is applied to an ink within a recording head, and ink droplets are generated by the thermal energy. Such an apparatus will hereinafter be described.

Figure 2:
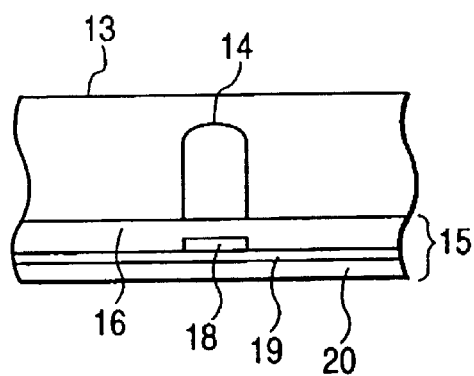
FIG. 2 is a transverse cross-sectional view taken along line 2—2 in FIG. 1.

FIGS. 1 and 2 are schematic sectional views illustrating an example of the construction of a head, which is a main component of such an image recording apparatus. Specifically, FIG. 1 is a schematic cross-sectional view of a head 13 taken along the flow path of ink, and FIG. 2 is a cross-sectional view taken along line 2—2 in FIG. 1. The head 13 is formed by bonding a glass, ceramic, silicon or plastic plate or the like having a flow path (nozzle) 14 through which an ink is passed, to a heating substrate 15. The heating substrate 15 is composed of a protective film 16 made of silicon oxide, silicon nitride, silicon carbide or the like, electrodes 17-1 and 17-2 formed of aluminum, gold, aluminum-copper alloy or the like, a heating resistor layer 18 formed of a high-melting material such as, $HfB_2$, TaN or TaAl, a heat accumulating layer 19 formed of silicon oxide, aluminum oxide or the like, and a substrate 20 made of silicon, aluminum, aluminum nitride or the like having a good heat radiating property.

Figure 3:
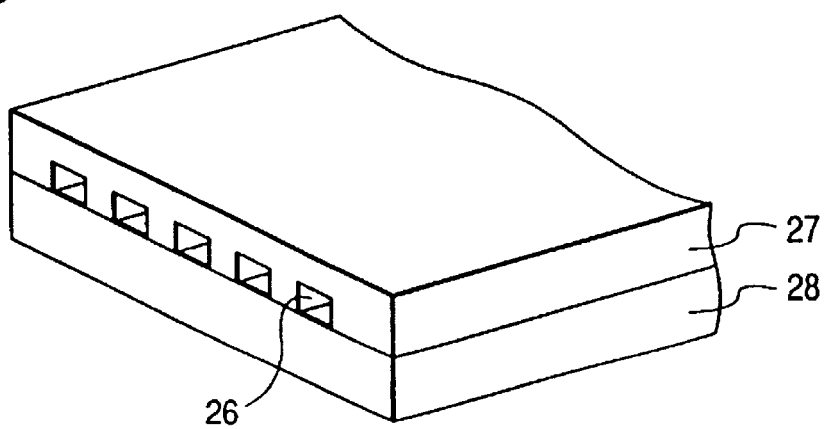
FIG. 3 schematically illustrates a multi-head.

Now, upon application of pulsed electric signals to the electrodes 17-1 and 17-2 of the head 13, the heating substrate 15 rapidly generates heat at the region shown by "n" to form bubbles in an ink 21 which is in contact with this region. A meniscus 23 of the ink is projected by the pressure thus produced, and the ink 21 is ejected from an ejection orifice 22 through the nozzle 14 of the head 13 as droplets 24 toward a recording medium 25. FIG. 3 illustrates an appearance of a multi-head composed of an array of a number of heads as shown in FIG. 1. The multi-head is formed by closely bonding a glass plate 27 having a number of grooves 26 to a heating head 28 similar to that described in FIG. 1.

Figure 4:
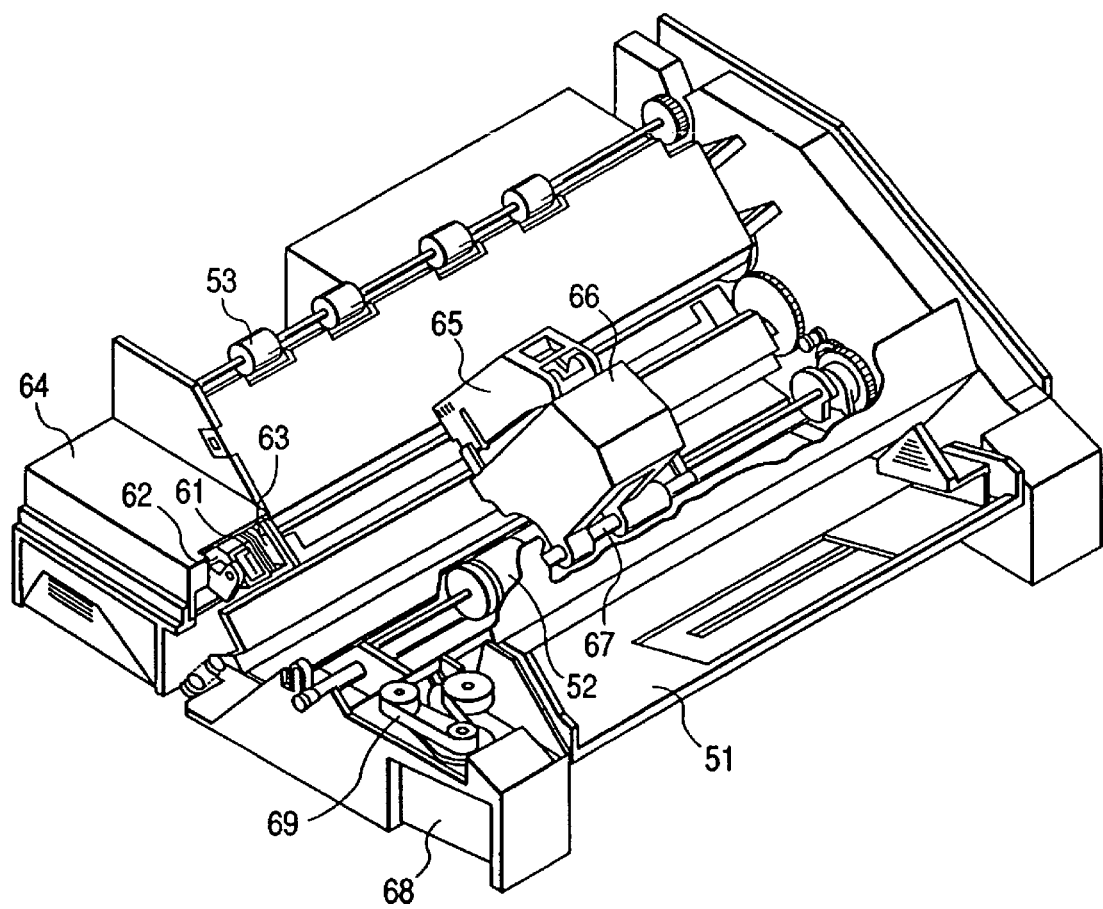
FIG. 4 is a schematic perspective view illustrating an ink-jet recording apparatus according to an embodiment.

FIG. 4 illustrates an example of an ink-jet recording apparatus in which such a head as described above has been incorporated. In FIG. 4, reference numeral 61 designates a blade serving as a wiping member, one end of which is a stationary end held by a blade-holding member to form a cantilever. The blade 61 is provided at a position adjacent to a region in which a recording head 65 operates, and in this embodiment, is held in such a form that it protrudes into the course through which the recording head 65 is moved. Reference numeral 62 indicates a cap for the face of ejection openings of the recording head 65, which is provided at a home position adjacent to the blade 61, and is so constructed that it moves in a direction perpendicular to a direction in which the recording head 65 is moved, and comes into contact with the face of the ejection openings to cap it. Reference numeral 63 denotes an ink absorbing member provided adjoiningly to the blade 61 and, similar to the blade 61, held in such a form that it protrudes into the course through which the recording head 65 is moved. The above-described blade 61, cap 62 and ink absorbing member 63 constitute an ejection-recovery portion 64, where the blade 61 and ink absorbing member 63 remove water, dust and/or the like from the face of the ink-ejecting openings. Reference numeral 65 designates the recording head having an ejection-energy-generating means and serving to eject the ink onto a recording medium set in an opposing relation to the ejection opening face provided with the ejection openings to conduct recording. Reference numeral 66 indicates a carriage on which the recording head 65 is mounted so that the recording head 65 can be moved. The carriage 66 is slidably interlocked with a guide rod 67 and is connected (not illustrated) at its part to a belt 69 driven by a motor 68. Thus, the carriage 66 can be moved along the guide rod 67 and hence, the recording head 65 can be moved from a recording region to a region adjacent thereto. Reference numerals 51 and 52 denote a feeding part from which the recording medium is inserted, and feed rollers driven by a motor (not illustrated), respectively. With such a construction, the recording medium is fed to the position opposite to the ejection opening face of the recording head 65, and discharged from a discharge section provided with discharge rollers 53 with the progress of recording. In the above construction, the cap 62 in the head recovery portion 64 is receded from the path of motion of the recording head 65 when the recording head 65 is returned to its home position, for example, after completion of recording, and the blade 61 remains protruded into the path of motion. As a result, the ejection opening face of the recording head 65 is wiped. When the cap 62 comes into contact with the ejection opening face of the recording head 65 to cap it, the cap 62 is moved so as to protrude into the path of motion of the recording head 65.

When the recording head 65 is moved from its home position to the position at which recording is started, the cap 62 and the blade 61 are at the same positions as the positions for the wiping as described above. As a result, the ejection opening face of the recording head 65 is also wiped at the time of this movement.

The above movement of the recording head 65 to its home position is made not only when the recording is completed or the recording head 65 is recovered for ejection, but also when the recording head 65 is moved between recording regions for the purpose of recording, during which it is moved to the home position adjacent to each recording region at given intervals, where the ejection opening face is wiped in accordance with this movement.

Figure 5:
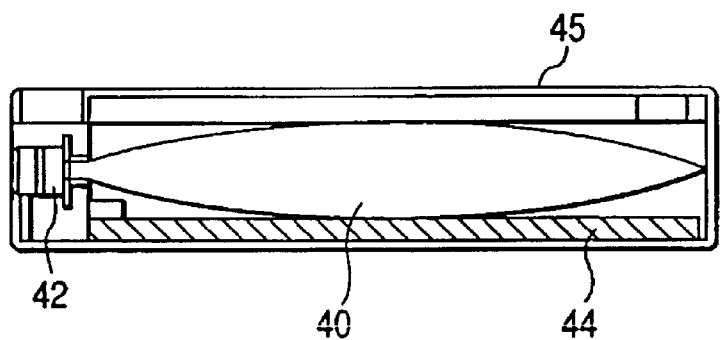
FIG. 5 is a longitudinal cross-sectional view of an ink cartridge according to an embodiment.

FIG. 5 illustrates an exemplary ink cartridge 45 in which an ink to be fed to a head through an ink-feeding member, for example, a tube is contained. Here, reference numeral 40 designates an ink container portion containing the ink to be fed, as exemplified by a bag for the ink. One end thereof is provided with a stopper 42 made of rubber. A needle (not illustrated) may be inserted into this stopper 42 so that the ink in the bag 40 for the ink can be fed to the head. Reference numeral 44 indicates an absorbing member for receiving a waste ink. It is preferred that the ink container portion 40 be formed of a polyolefin, in particular, polyethylene, at its surface with which the ink comes into contact.

[Recording Unit]

Figure 6:
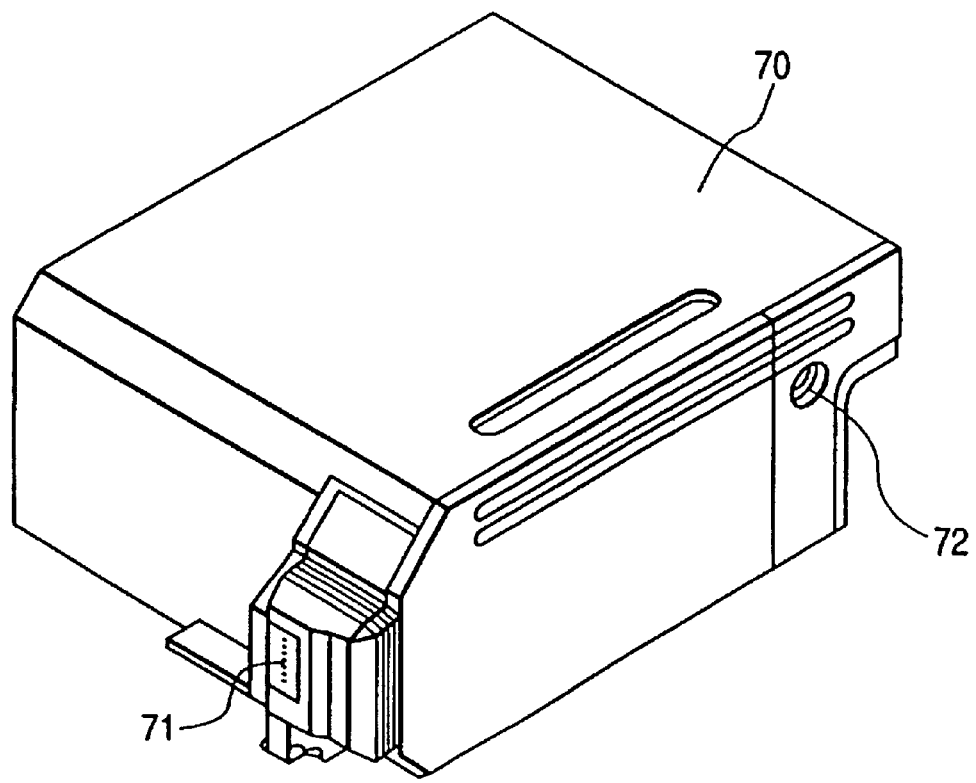
FIG. 6 is a perspective view of a recording unit.

The ink-jet recording apparatus used in the present invention are not limited to the apparatus as described above in which the head and the ink cartridge are separately provided. Therefore, a device in which these members are integrally formed as shown in FIG. 6 can also be preferably used. In FIG. 6, reference numeral 70 designates a recording unit, in the interior of which an ink container portion containing an ink, for example, an ink absorbing member, is contained. The recording unit 70 is so constructed that the ink in such an ink absorbing member is ejected in the form of ink droplets through a head 71 having a plurality of orifices. In the present invention, polyurethane is preferably used as a material for the ink absorbing member. The ink container portion may be constructed without using the ink absorbing member by a bag for the ink in the interior of which a spring or the like is provided. Reference numeral 72 indicates an air passage for communicating the interior of the recording unit 70 with the atmosphere.

This recording unit 70 is used in place of the recording head 65 shown in FIG. 4, and is detachably installed on the carriage 66.

[Ink-jet Recording Apparatus and Recording Process Using Piezoelectric Element]

As a preferable example of an ink-jet recording apparatus making good use of mechanical energy, may be mentioned an On-Demand type ink-jet recording apparatus comprising a nozzle-forming substrate having a plurality of nozzles, pressure-generating devices composed of a piezoelectric material and an electric conductive material provided in an opposing relation to the nozzles, and an ink filled around the pressure-generating devices, wherein the pressure-generating devices are changed by voltage applied to eject droplets of the ink from the nozzles.

Figure 7:
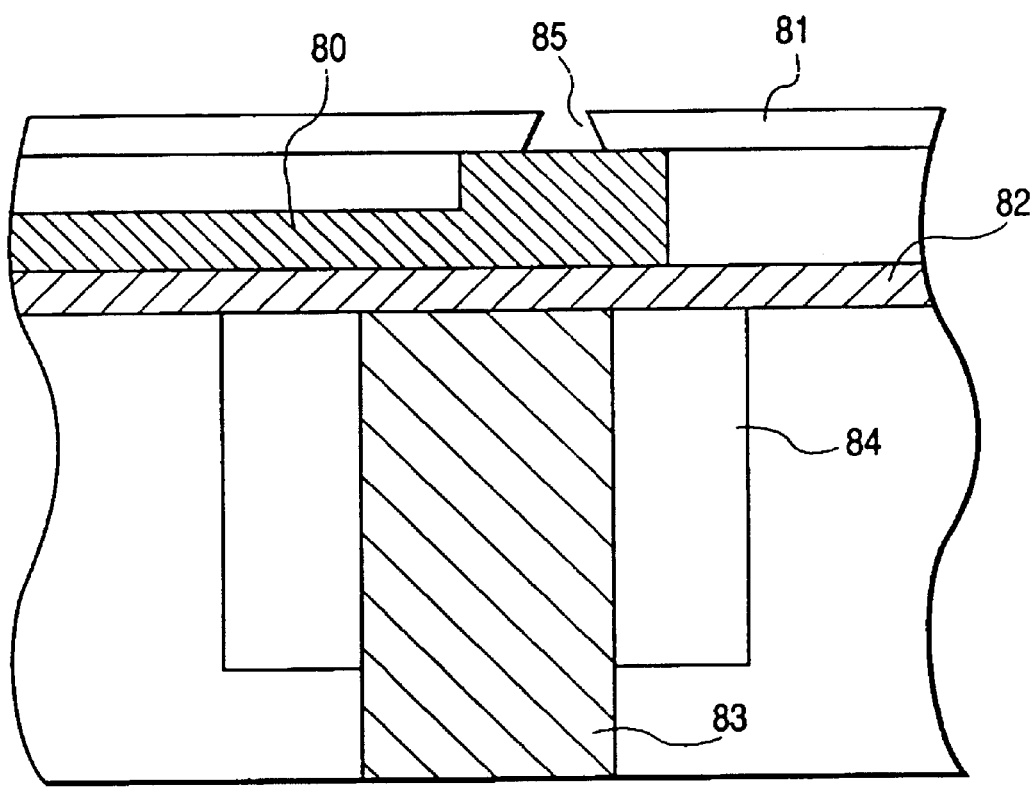
FIG. 7 is a schematic perspective view illustrating another exemplary construction of an ink-jet recording head.

An example of the construction of a recording head, which is a main component of such a recording apparatus, is illustrated in FIG. 7.

The head is composed of an ink flow path 80 communicating with an ink chamber (not illustrated), an orifice plate 81 through which ink droplets having a desired volume are ejected, a vibration plate 82 for directly applying a pressure to the ink, a piezoelectric element 83 bonded to the vibration plate 82 undergoing a change according to an electric signal, and a substrate 84 adapted to support and fix the orifice plate 81, the vibration plate 82 and the like thereon.

In FIG. 7, the ink flow path 80 is formed with a photosensitive resin or the like. The orifice plate 81 is made of a metal such as stainless steel or nickel, and an ejection opening 85 of which is formed by electroforming, punching by press working, or the like. The vibration plate 82 is formed with a film of a metal such as stainless steel, nickel or titanium and a high-modulus resin film or the like. The piezoelectric element 83 is made of a dielectric material such as barium titanate or PZT.

The recording head with the above construction is operated in such a manner that pulsed voltage is applied to the piezoelectric element 83 to generate a stress to cause strain, the vibration plate 82 bonded to the piezoelectric element 83 is deformed by the energy of the stress, and the ink in the ink flow path 80 is thus perpendicularly pressurized to eject ink droplets (not illustrated) from the ejection opening 85 of the orifice plate 81, thereby conducting recording.

Such a recording head is used by incorporating it into an ink-jet recording apparatus similar to that illustrated in FIG. 4. Operation of details of the ink-jet recording apparatus may be conducted in the same manner as described above.

[Ink Set]

The above-described inks according to the various embodiments of the present invention constitute black inks and can each be provided as an ink set suitable for use in the formation of color images by combining it with at least one color ink selected from the group consisting of color inks comprising coloring materials for yellow, magenta, cyan, red, blue and green, respectively, In particular, the black inks according to the second embodiment can extremely effectively reduce the occurrence of bleeding when used together with an ink comprising at least one of a water-soluble dye having an anionic group and a compound containing at least an anionic group, since an ionic reaction takes place in a boundary region between both inks on a recording medium. Examples of the water-soluble dye having an anionic group include the conventionally known direct dyes and acid dyes.

Examples of the compound containing at least an anionic group include the conventionally known anionic surfactants and anionic group-containing high-molecular compounds. In these, pigment dispersants and the like are also included.

(Color Ink)

As coloring materials for the color inks usable for the above ink set, may be used publicly known dyes and pigments. As the dyes, for example, acid dyes and direct dyes may be used. As, for example, anionic dyes, most of both dyes already known and newly synthesized may be used so far as they have proper color tone and density. Some of them may also by used in combination. As Specific examples of the anionic dyes, may be mentioned the following dyes:

(Coloring Material for Yellow)

C.I. Direct Yellow 8, 11, 12, 27, 28, 33, 39, 44, 50, 58, 85, 86, 87, 88, 89, 98, 100 and 110;

C.I. Acid Yellow 1, 3, 7, 11, 17, 23, 25, 29, 36, 38, 40, 42, 44, 76, 98 and 99;

C.I. Reactive Yellow 2, 3, 17, 25, 37 and 42; and

C.I. Food Yellow 3.

(Coloring Material for Red)

C.I. Direct Red 2, 4, 9, 11, 20, 23, 24, 31, 39, 46, 62, 75, 79, 80, 83, 89, 95, 197, 201, 218, 220, 224, 225, 226, 227, 228 and 229;

C.I. Acid Red 6, 8, 9, 13, 14, 18, 26, 27, 32, 35, 42, 51, 52, 80, 83, 87, 89, 92, 106, 114, 115, 133, 134, 145, 158, 198, 249, 265 and 289;

C.I. Reactive Red 7, 12, 13, 15, 17, 20, 23, 24, 31, 42, 45, 46 and 59; and

C.I. Food Red 87, 92 and 94.

(Coloring Material for Blue)

C.I. Direct Blue 1, 15, 22, 25, 41, 76, 77, 80, 86, 90, 98, 106, 108, 120, 158, 163, 168, 199 and 226;

C.I. Acid Blue 1, 7, 9, 15, 22, 23, 25, 29, 40, 43, 59, 62, 74, 78, 80, 90, 100, 102, 104, 117, 127, 138, 158 and 161; and C.I. Reactive Blue 4, 5, 7, 13, 14, 15, 18, 19, 21, 26, 27, 29, 32, 38, 40, 44 and 100.

(Coloring Material for Black)

C.I. Acid Black 2, 4, 8, 51, 52, 110, 115, 156; and

C.I. Food Black 1 and 2.

(Solvent)

Examples of solvents or dispersion media for inks respectively comprising such coloring materials for color inks as described above include water and mixed solvents of water and a water-soluble organic solvent. Examples of the water-soluble organic solvent include the same solvents as those described in the first embodiment. When such color inks are applied to a recording medium by an ink-jet system (for example, bubble-jet system), it is preferred that the inks be controlled so as to have the desired viscosity and surface tension in order for the inks to exhibit excellent ink-jet ejection properties as described above.

(Content of Coloring Material)

The content of the coloring material in each of the color inks may be suitably selected in such a manner that such an ink has excellent ink-jet ejection properties and the desired color tone and density when it is used in, for example, ink-jet recording. For example, as a standard, it is preferably within a range of from 3 to 50% by weight based on the total weight of the ink. The amount of water contained in the ink is preferably within a range of from 50 to 95% by weight based on the total weight of the ink.

[Recording Apparatus and Recording Process Using Ink Sets]

Figure 8:
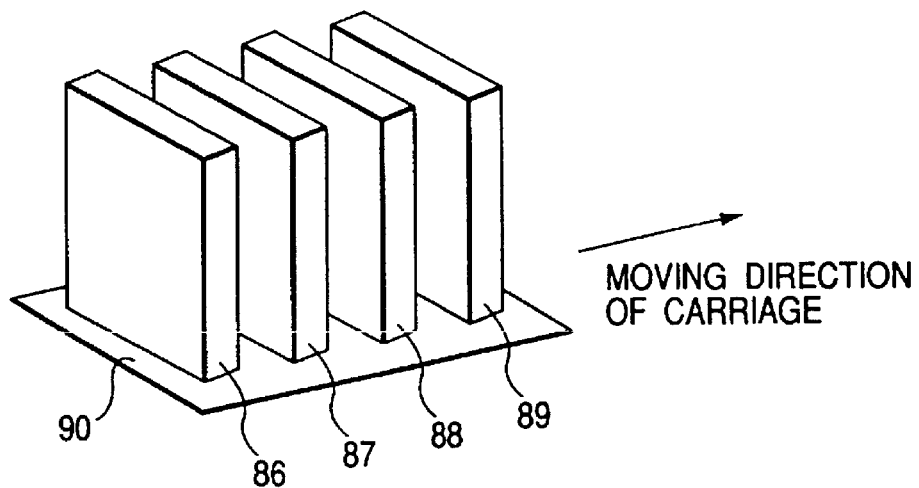
FIG. 8 schematically illustrates a recording head in which 4 ink cartridges are installed.
Figure 9:
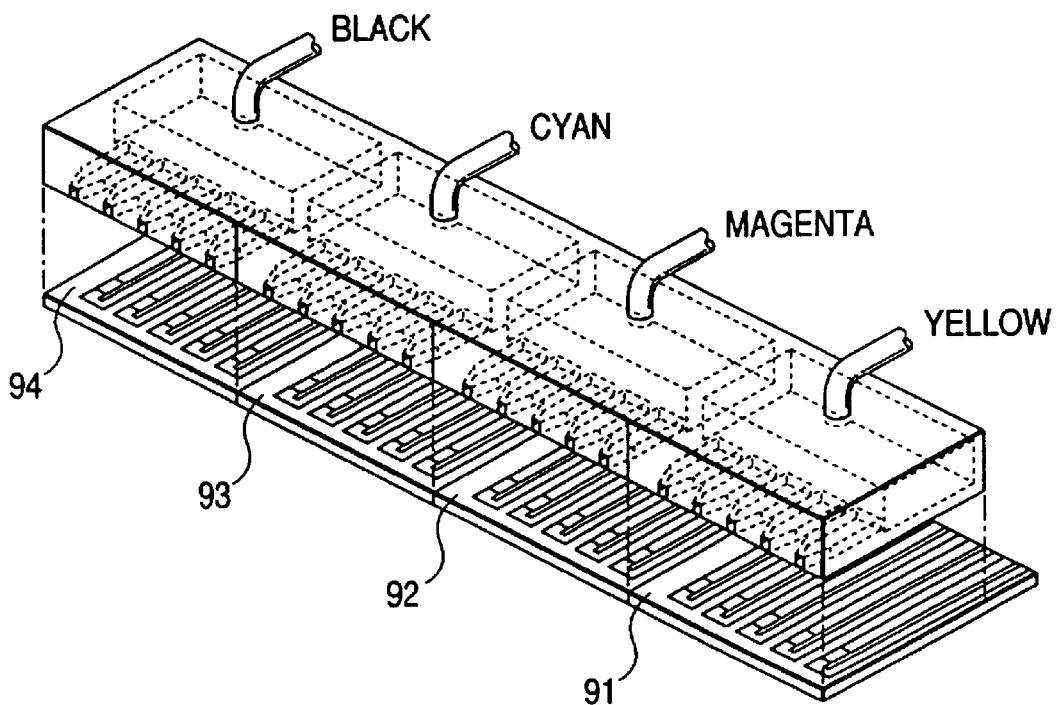
FIG. 9 schematically illustrates the construction that 4 recording heads are arranged on a carriage.

When each of the above-described ink sets is used to record color images, for example, a recording apparatus in which 4 recording heads, each of which has been illustrated in FIG. 3, are arranged on a carriage, may be used. An embodiment thereof is illustrated in FIG. 9. Reference numerals 91, 92, 93 and 94 indicate recording units for ejecting yellow, magenta, cyan and black inks, respectively. The recording units are arranged on a carriage of the above-described recording apparatus and serve to eject the respective inks in response to recording signals. FIG. 9 shows the case where the four recording heads have been used. However, the present invention is not limited thereto. For example, an embodiment, wherein ink cartridges 86 to 89 respectively containing the above four colors ink are set in a recording head 90 in which ink flow paths are separately formed in such a manner that the color inks fed from the ink cartridges 86 to 89 can be separately ejected by one recording head as shown in FIG. 8, thereby conducting recording, is also included.

The present invention will hereinafter be described more specifically by the following Examples and Comparative Examples. However, the present invention is not limited to the following examples so far as it does not exceed the subject matter thereof. Incidentally, all designations of "part" or "parts" and "%" as will be used in the following examples mean part or parts by weight and % by weight unless expressly noted. In the following examples, the average particle diameter is a value measured by means of a dynamic light scattering particle diameter measurement equipment (ELS-800, trade name, manufactured by Ohtsuka Denshi K.K.).

EXAMPLES 1 TO 6

Dispersions C-1 and C-2 were provided as carbon black dispersions.

(Preparation of Dispersion C-1)

Dispersion C-1 was prepared in the following manner.

A styrene-methacrylic acid-ethyl acrylate copolymer (acid value: 350; weight average molecular weight: 3,000; as a 20% aqueous solution; neutralizing agent: potassium hydroxide) was used as a dispersant. The following materials were charged in a batch-wise sand mill (manufactured by Aimex Company), and glass beads having a diameter of 1 mm were charged as a grinding medium to conduct a dispersion treatment for 3 hours while cooling with water.

| | |
|---|---|
| Aqueous solution of dispersant (20% aqueous solution) | 30 parts |
| Carbon black (Mogul, trade name; product of Cablack Co.) | 20 parts |
| Glycerol | 10 parts |
| Water | 30 parts. |

The carbon black dispersion thus obtained had an average particle diameter of 0.1 µm and a pH of 10.0.

(Preparation of Dispersion C-2)

Dispersion C-2 was obtained in the same manner as the preparation of Dispersion C-1 except that self-dispersing carbon black CAB-O-JET 200 (trade name, product of CABOT Co.; solid content: 20%; having a sulfonic group as a functional group on its surface) was used. The carbon black dispersion thus obtained had an average particle diameter of 0.13 µm and a pH of 7.0. Preparation of Dispersions MC-1 and MC-2 of resins encapsulating a coloring material:

Dispersions MC-1 and MC-2 were also provided as dispersions of resins encapsulating a coloring material.

(Preparation of Dispersion MC-1)

The following materials were mixed into a solution.

| | |
|---|---|
| C.I. Solvent Black 3 | 10 parts |
| Styrene-acrylic acid copolymer (acid value: 200; molecular weight: 30,000) | 40 parts |
| Methyl ethyl ketone | 50 parts. |

The resultant solution was phase inversion-emulsified in water using sodium hydroxide as a neutralizing agent, and methyl ethyl ketone was removed to finally obtain an aqueous dispersion of microcapsules having an average particle diameter of 0.08 µm containing solids at a concentration of 20%.

(Preparation of Dispersion MC-2)

An aqueous dispersion of microcapsules having an average particle diameter of 0.13 µm containing solids at a concentration of 20% was finally obtained in the same manner as the preparation of Dispersion MC-1 except that the resin used in Dispersion MC-1 was changed to a styrene-acrylic acid-methyl methacrylate terpolymer (acid value: 250; molecular weight: 25,000).

After the respective dispersions provided in the above-described manner were mixed so as to give solid contents in their corresponding proportions shown in Table 1, glycerol and isopropyl alcohol were mixed with each of the mixtures in such a manner that the concentrations of glycerol and isopropyl alcohol amount to 16% and 4.0%, respectively, thereby preparing respective inks finally containing carbon black and the resin encapsulating the coloring material at a concentration of 8% in terms of total solid content in each ink.

"C.B./MC" shown in Table 1 indicates final concentrations of the respective solids (i.e. carbon black and the resin) in each ink prepared. More specifically, it indicates that, for example, Ink A according to Example 1 was prepared in such a manner that the solid contents of carbon black and the resin encapsulating the coloring material amount to 1.5% and 6.5%, respectively. Incidentally, the amount of carbon black in Examples 1 to 3 in Table 1 means the total solid content of carbon black and the dispersant. On the other hand, the amount of carbon black in Examples 4 to 6 means an amount of carbon black alone because no dispersant was used for the carbon black.

The six inks A, B, C, D, E and F thus prepared were separately charged into an ink tank for black of a BJ Cartridge BC-21 installed in a color BJ printer BJC-420J (trade name; manufactured by Canon Inc.), and the cartridge was set in BJC-420 to conduct printing on recording paper Canon PB Paper (trade name, product of Canon Inc.; paper for common use in BJ-electrophotography) in accordance with the 360×360 DPI, HQ mode for plain paper of BJC-420J.

COMPARATIVE EXAMPLES 1 TO 3

Inks G and H containing only their corresponding carbon black shown in Table 1, and Ink I containing only its corresponding resin encapsulating a coloring material shown in Table 1 were used to conduct printing in exactly the same manner as in Examples 1 to 6.

TABLE 1

|  | Ink | C.B. dispersion | Resin encapsulating coloring material | C.B./MC |
|---|---|---|---|---|
| Ex. 1 | A | C-1 | MC-1 | 1.5/6.5 |
| Ex. 2 | B | C-1 | MC-1 | 3.0/5.0 |
| Ex. 3 | C | C-1 | MC-1 | 4.0/4.0 |
| Ex. 4 | D | C-2 | MC-2 | 1.5/6.5 |
| Ex. 5 | E | C-2 | MC-2 | 3.0/5.0 |
| Ex. 6 | F | C-2 | MC-2 | 4.0/4.0 |
| Comp. Ex. 1 | G | C-1 | Not used | 8.0/0 |
| Comp. Ex. 2 | H | C-2 | Not used | 8.0/0 |
| Comp. Ex. 3 | I | Not used | MC-1 | 0/8.0 |

The thus-obtained prints were evaluated in the following manner:

Optical Density of Image:

After a solid printed sample was left to stand for 12 hours after its printing, its optical density was measured by means of a reflection densitometer, Macbeth RD-918 (trade name, manufactured by Macbeth Company). The evaluation result was ranked in accordance with the following standard:

A: Optical density was not lower than 1.35;

B: Optical density was from 1.2 to 1.34; and

C: Optical density was lower than 1.2.

Water Fastness:

The same solid printed sample as that used in the evaluation of the optical density of image was used and left to stand for 12 hours after the printing. The image sample was then dipped in tap water for 3 seconds and dried to measure its optical density by means of the reflection densitometer described above, whereby the percent retention of the optical density was found from the optical densities before and after the water fastness test to use it as a measure of the water fastness. The evaluation result was ranked in accordance with the following standard:

A: Percent retention of optical density was not lower than 90%;

B: Percent retention of optical density was not lower than 70% but lower than 90%;

C: Percent retention of optical density was lower than 70%.

Resistance to Line Marker:

Upon elapsed time of 1 hour after the printing of characters, the character portion of the resulting print sample was marked once under ordinary writing pressure with a yellow fluorescent pen, Spot Lighter Yellow, (trade name; product of Pilot Pen Co., Ltd.), whereby the resistance to line marker was ranked in accordance with the following evaluation standard:

A: Neither bleeding nor stain on white portions was observed in the print sample, and a pen point was also not stained;

B: No stain on white portions was observed in the print sample, but a pen point was somewhat stained; and C: Stain on white portion was observed in the print sample.

Rub-off Resistance:

Upon elapsed time of 4 hours after the printing of an image, silbon paper was placed on the paper printed, and an 1-kg weight having a bottom area of 5 cm square was then placed on the silbon paper. The silbon paper was then pull out to visually observe whether the unprinted portions (white portions) of the printed paper and the silbon paper were stained by the rubbing between the printed portions of the printed paper and the silbon paper. The rub-off resistance was ranked in accordance with the following evaluation standard:

A: No stain was observed in both white portions and silbon paper;

B: Stain was observed in the silbon paper alone; and

C: Stain was observed in both white portions and silbon paper.

Ejection Stability:

An 1-dot vertical line was printed on recording paper at the beginning of use of Cartridge BC-21. Text printing was conducted until the Cartridge BC-21 was consumed. The cartridge right before it was consumed was used to print an 1-dot vertical line on another recording paper. These recording paper samples were visually observed from a position 25 cm distant, thereby comparing the result of the printing by the cartridge at the beginning of use with the result of the printing by the cartridge right before it was consumed to rank the ejection stability in accordance with the following evaluation standard:

A: No difference was observed between both samples;

B: Deviation of dot impact was observed in a part of the vertical line printed by the cartridge right before it was consumed, but the line could be recognized as a straight line; and C: Deviation of dot impact was clearly observed in the vertical line printed by the cartridge right before it was consumed, and the vertical line could be recognized to deviate.

The evaluation results are shown in Table 2.

TABLE 2

|  | Optical density | Water fastness | Resistance to line marker | Rub-off resistance | Ejection stability |
|---|---|---|---|---|---|
| Ex. 1 | B | A | A | A | B |
| Ex. 2 | B | A | A | A | B |
| Ex. 3 | A | A | B | A | B |
| Ex. 4 | A | A | A | A | A |
| Ex. 5 | A | A | A | A | A |
| Ex. 6 | A | A | A | A | A |
| Comp. Ex. 1 | A | A | C | C | B |
| Comp. Ex. 2 | A | A | C | C | A |
| Comp. Ex. 3 | C | A | A | A | A |

It is understood from Table 2 that the inks according to the present invention are inks for ink-jet, which can provide an image sufficiently high in optical density on plain paper and excellent in water fastness, resistance to line marker and rub-off resistance and are sufficiently good in ejection stability. The inks of the sole system of carbon black and the ink of the sole system of the resin encapsulating the coloring material could not obtain results satisfying all the optical density of image, water fastness, resistance to line marker, rub-off resistance and ejection stability at the same time.

EXAMPLES 7 TO 12

Dispersions C-3 and C-4 were provided as carbon black dispersions.

(Preparation of Dispersion C-3)

Dispersion C-3 was prepared in the following manner.

Cationic Polymer P-1 (weight average molecular weight: 11,000, pH of aqueous solution: 3.26) containing acrylamide and trimethylaminopropylacrylamide sulfate as monomers in a weight ratio of 70:30 was used as a dispersant to prepare the following Carbon Black Dispersion C-3.

| | |
|---|---|
| Aqueous solution of Cationic Polymer P-1 (solid content: 20%) | 20 parts |
| Carbon black #2600 (product of Mitsubishi Kagaku Co., Ltd.) | 10 parts |
| Diethylene glycol | 5 parts |
| Isopropyl alcohol | 5 parts |
| Water | 60 parts. |

The above materials were charged in-a batch-wise vertical sand mill (manufactured by Aimex Company), and glass beads having a diameter of 1 mm were charged as a grinding medium to conduct a dispersion treatment for 3 hours while cooling with water. After the dispersion treatment, the dispersion had a viscosity of 28 cP and a pH of 4.05. This dispersion was centrifuged to remove coarse particles, thereby obtaining Dispersion C-3 having an average particle diameter of 0.12 μm. The dispersion had a solid content of 10% in total.

(Preparation of Dispersion C-4)

Dispersion C-4 was prepared in the following manner.

After 10 g of carbon black having a surface area of 230 m²/g and a DBP oil absorption of 70 ml/100 g, and 3.06 g of 3-amino-N-ethylpyridinium bromide were thoroughly mixed with 72 g of water, 1.62 g of nitric acid were added dropwise to the mixture, followed by stirring at 70° C. After several minutes, a solution with 1.07 g of sodium nitrite dissolved in 5 g of water was further added to the mixture, and the resultant mixture was stirred for an additional 1 hour. The resultant slurry was filtered through filter paper (Toyo Filter Paper No. 2, trade name; product of Advantes Co.), and the resultant pigment particles were fully washed with water and dried in an oven controlled to 110° C. Water was added to the dry pigment to prepare an aqueous dispersion of the pigment having a pigment concentration of 10%. The above-described process was followed to introduce a group of the chemical formula

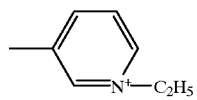

in the surface of the carbon black.

Preparation of Dispersions MC-3 and MC-4 of Resins Encapsulating a Coloring Material:

Dispersions MC-3 and MC-4 were also provided as dispersions of resins encapsulating a coloring material.

(Preparation of Dispersion MC-3)

The following materials were mixed into a solution.

| | |
|---|---|
| C.I. Solvent Black 3 | 10 parts |
| Styrene-N,N-dimethylaminoethyl methacrylate copolymer (molecular weight: 40,000) | 40 parts |
| Methyl ethyl ketone | 50 parts. |

The resultant solution was phase inversion-emulsified using acetic acid as a neutralizing agent, and methyl ethyl ketone was removed to finally obtain an aqueous dispersion of microcapsules having an average particle diameter of 0.08 μm containing solids at a concentration of 20%.

(Preparation of Dispersion MC-4)

An aqueous dispersion of microcapsules having an average particle diameter of 0.13 μm containing solids at a concentration of 20% was finally obtained in the same manner as the preparation of Dispersion MC-3 except that the resin used in Dispersion MC-3 was changed to a styrene-N,N-dimethylaminopropyl methacrylate copolymer (molecular weight: 35,000).

After the respective dispersions provided in the above-described manner were mixed so as to give solid contents in their corresponding proportions shown in Table 3, glycerol and isopropyl alcohol were mixed with each of the mixtures in such a manner that the concentrations of glycerol and isopropyl alcohol amount to 16% and 4.0%, respectively, thereby preparing respective inks finally containing carbon black and the resin encapsulating the coloring material at a concentration of 8% in terms of total solid content in each ink. C.B./MC shown in Table 3 indicates final concentrations of the respective solids in each ink prepared. More specifically, it indicates that Ink A according to Example 7 was prepared in such a manner that the solid contents of carbon black and the resin encapsulating the coloring material amount to 1.5% and 6.5%, respectively. The same shall apply hereinafter. Incidentally, the amount of carbon black in Examples 7 to 9 in Table 3 means the total solid content of carbon black and the dispersant. On the other hand, the amount of carbon black in Examples 10 to 12 means an amount of carbon black alone because no dispersant was used for the carbon black.

The six Inks J, K, K, M, N and 0 thus prepared were separately charged into an ink tank for black of a BJ Cartridge BC-21 installed in a color BJ printer (BJC-420J, trade name; manufactured by Canon Inc.), and the cartridge was set in BJC-420 to conduct printing on recording paper, Canon PB Paper, (trade name, product of Canon Inc.; paper for common use in BJ-electrophotography) in accordance with the 360×360 DPI, HQ mode for plain paper of BJC-420J. The thus-obtained prints were evaluated as to optical density of image, water fastness, resistance to line marker, rub-off resistance and ejection stability in exactly the same manner as in Examples 1 to 6. The evaluation results are shown in Table 4.

COMPARATIVE EXAMPLES 4 TO 6

Inks P and Q containing only their corresponding carbon black shown in Table 3, and Ink R containing only its corresponding resin encapsulating a coloring material shown in Table 3 were prepared in the same manner as in the inks according to Examples 7 to 12 and evaluated as to optical density of image, water fastness, resistance to line marker, rub-off resistance and ejection stability in exactly the same manner as in Examples 7 to 12. The evaluation results are shown in Table 4.

TABLE 3

| | Ink | C.B. dispersion | Resin encapsulating coloring material | C.B./MC |
|---|---|---|---|---|
| Ex. 7 | J | C-3 | MC-3 | 1.5/6.5 |
| Ex. 8 | K | C-3 | MC-3 | 3.0/5.0 |
| Ex. 9 | L | C-3 | MC-3 | 4.0/4.0 |
| Ex. 10 | M | C-4 | MC-4 | 1.5/6.5 |
| Ex. 11 | N | C-4 | MC-4 | 3.0/5.0 |
| Ex. 12 | O | C-4 | MC-4 | 4.0/4.0 |
| Comp. Ex. 4 | P | C-3 | Not used | 8.0/0 |

TABLE 3-continued

|  | Ink | C.B. dispersion | Resin encapsulating coloring material | C.B./MC |
|---|---|---|---|---|
| Comp. Ex. 5 | Q | C-4 | Not used | 8.0/0 |
| Comp. Ex. 6 | R | Not used | MC-3 | 0/8.0 |

Optical density, water-fastness, resistance to line marker, rub-off resistance and efection stability were evaluated in the same manner as in Examples 1 to 6. The results are shown in Table 4.

TABLE 4

|  | Optical density | Water fastness | Resistance to line marker | Rub-off resistance | Ejection stability |
|---|---|---|---|---|---|
| Ex. 7 | B | A | A | A | B |
| Ex. 8 | B | A | A | A | B |
| Ex. 9 | A | A | B | A | B |
| Ex. 10 | A | A | A | A | A |
| Ex. 11 | A | A | A | A | A |
| Ex. 12 | A | A | A | A | A |
| Comp. Ex. 4 | A | A | C | C | B |
| Comp. Ex. 5 | A | A | C | C | A |
| Comp. Ex. 6 | C | A | A | A | A |

It is understood from Table 4 that the use of the inks according to the above examples can provide images sufficiently high in optical density on plain paper and excellent in water fastness, resistance to line marker and rub-off resistance. As shown in Table 4, the inks of the sole system of carbon black and the ink of the sole system of the resin encapsulating the coloring material could not obtain results satisfying all the optical density of image, water fastness, resistance to line marker, rub-off resistance and ejection stability at the same time.

EXAMPLES 13 TO 18

Inks J to O prepared in Examples 7 to 12, respectively, were separately charged into an ink tank for black of a color BJ printer, BJC-610JW, (trade name; manufactured by Canon Inc.) to use them for evaluation in Examples 13 to 18. Color inks exclusively prepared for BJC-610JW were used as color inks. Black characters were printed in a color solid-printed background on PB paper (product of Canon Inc.), thereby evaluating Inks J to O as to resistance to color bleed between a black image formed with each of such inks and a color image. More specifically, resistance to color bleed between black and yellow, resistance to color bleed between black and cyan, and resistance to color bleed between black and magenta were separately evaluated.

As a control example, a black ink and color inks exclusively prepared for BJC-610JW were used to evaluate them as to resistance to color bleed in the same manner as described above. As a result, in each of Examples 13 to 18, color bleeds were reduced compared with the control example, no exudation of the black characters into the color background occurred, and the sharpness of the black characters was also recognized to be improved compared with the control example.

At this time, the optical density, water fastness, resistance to line marker and rub-off resistance of the images formed with the black inks according to Examples 13 to 18 were evaluated (printing was conducted in accordance with Bk accent mode). As a result, the same results as in Examples 7 to 12 were obtained.

EXAMPLES 19 TO 24

Dispersions MC-5 was provided as a dispersion of a resin encapsulating carbon black as a coloring material.

(Preparation of Dispersion MC-5)

The following materials were mixed and dispersed.

| Carbon black MCF-88 (trade name; product of Mitsubishi Kagaku Co., Ltd.) | 20 parts |
|---|---|
| Styrene-N,N-dimethylaminoethyl methacrylate copolymer (molecular weight: 45,000) | 40 parts |
| Methyl ethyl ketone | 40 parts. |

The resultant mixture was phase inversion-emulsified using acetic acid as a neutralizing agent, and methyl ethyl ketone was removed to finally obtain an aqueous dispersion of a cationic resin encapsulating carbon black having an average particle diameter of 0.10 $\mu$m containing solids at a concentration of 20%.

After the aqueous dispersion MC-5 of the carbon black-containing resin provided in the above-described manner and the carbon black dispersion C-3 and C-4 prepared in Examples 7 to 12 were mixed so as to give solid contents in their corresponding proportions shown in Table 5, glycerol, propylene glycol and isopropyl alcohol were mixed with each of the mixtures in such a manner that the concentrations of glycerol, propylene glycol and isopropyl alcohol amount to 7.0%, 8.0% and 4.0%, respectively, thereby preparing respective inks finally containing carbon black and the resin encapsulating the carbon black at a concentration of 8% in terms of total solid content in each ink.

TABLE 5

|  | Ink | C.B. dispersion | Resin encapsulating coloring material | C.B./MC |
|---|---|---|---|---|
| Ex. 19 | S | C-3 | MC-5 | 1.5/6.5 |
| Ex. 20 | T | C-3 | MC-5 | 3.0/5.0 |
| Ex. 21 | U | C-3 | MC-5 | 4.0/4.0 |
| Ex. 22 | V | C-4 | MC-5 | 1.5/6.5 |
| Ex. 23 | W | C-4 | MC-5 | 3.0/5.0 |
| Ex. 24 | X | C-4 | MC-5 | 4.0/4.0 |

The inks thus obtained were evaluated as to optical density of image, water fastness, resistance to line marker, rub-off resistance and ejection stability in the same manner as in Examples 7 to 12. However, the ranking of the optical density of image was conducted in accordance with the following standard:

AA: Optical density was not lower than 1.4;

A: Optical density was from 1.35 to 1.39;

B: Optical density was from 1.2 to 1.34; and

C: Optical density was lower than 1.2.

The evaluation results are shown in Table 6.

TABLE 6

|  | Optical density | Water fastness | Resistance to line marker | Rub-off resistance | Ejection stability |
| --- | --- | --- | --- | --- | --- |
| Ex. 19 | B | A | A | A | B |
| Ex. 20 | A | A | A | A | A |
| Ex. 21 | A | A | A | A | A |
| Ex. 22 | AA | A | A | A | A |
| Ex. 23 | AA | A | A | A | A |
| Ex. 24 | AA | A | A | A | A |

EXAMPLES 25 TO 30

Color inks having their corresponding compositions shown below were prepared.

| Yellow ink: | |
| --- | --- |
| C.I. Direct Yellow 86 | 3.5 parts |
| Glycerol | 10.0 parts |
| Acetylenol EH (trade name, product of Kawaken Fine Chemicals Co., Ltd.; acetylene glycol type surfactant) | 1.0 parts |
| Water | 85.5 parts. |
| Magenta ink: | |
| C.I. Acid Red 285 | 3.5 parts |
| Glycerol | 10.0 parts |
| Acetylenol EH (ditto) | 1.0 part |
| Water | 85.5 parts. |
| Cyan ink: | |
| C.I. Acid Blue 199 | 3.5 parts |
| Glycerol | 10.0 parts |
| Acetylenol EH (ditto) | 1.0 part |
| Water | 85.5 parts. |

These inks were respectively charged into ink tanks for color ink of a color BJ printer BJC-610JW (trade name; manufactured by Canon Inc.). The black inks S to X prepared in Examples 19 to 24, respectively, were separately charged into an ink tank for black ink of the color BJ printer, BJC-610JW, to use them for evaluation in Examples 25 to 30. Resistance to color bleed between each of the black inks S to X and the above-described color inks of yellow, magenta and cyan was evaluated in exactly the same manner as in Example 13 to 18. The results thereof were the same as in Examples 13 to 18. No exudation into the color background occurred in the black images formed with the black inks S to X, and the sharpness of the black characters was also improved compared with the control example. At this time, the optical density, water fastness, resistance to line marker and rub-off resistance of the images formed with the black inks alone were evaluated (printing was conducted in accordance with Bk accent mode). As a result, exactly the same results as in Examples 19 to 24 were obtained.

According to the present invention, as described above, there can be provided inks which can provide images improved in resistance to line marker and rub-off resistance without impairing the merits of a pigment ink that it can provide images excellent in optical density and water fastness, and moreover are also excellent in reliability (ejection durability, ejection stability, anti-clogging property, etc.) upon ink-jet recording.

It is also possible to form images having excellent resistance to line marker and rub-off resistance in addition to high optical density of image and excellent water fastness.

By the encapsulation in a resin, the hydrophobic group of the resin is basically arranged inside a capsule, while the hydrophilic group of the resin is arranged outside the capsule. Therefore, the resin is hard to adhere to the ejection opening face of a recording head when the ejection opening face is subjected to a water-repellent treatment, and so the resin can be effectively prevented from depositing on the ejection opening face of the ink-jet head. Therefore, the ejection stability of the ink can be still more improved.

According to the present invention, the problems of a pigment ink can also be offset without impairing the merits of the pigment ink. More specifically, there can be stably provided images high in optical density and excellent in water fastness, resistance to line marker and rub-off resistance. When a resin capsule is used as the resin encapsulating a coloring material, the hydrophobic group of the resin is basically arranged inside a capsule, while the hydrophilic group of the resin is arranged outside the capsule. Therefore, the resin is hard to adhere to the ejection opening face of a recording head when the ejection opening face is subjected to a water-repellent treatment, and so the resin can be prevented from depositing on the ejection opening face of the ink-jet head. Therefore, the ejection stability of the ink can be still more improved.

When a multi-color image is formed with at least two inks according to the present invention by ink-jet recording, bleeding on a recording medium can be effectively lessened in addition to the above-described effects.

What is claimed is:

1. An aqueous ink for an ink-jet printing process comprising:

a self-dispersing pigment and a resin encapsulating a coloring material, both of which are dispersed in an aqueous medium such that the total amount of the solid concentration of the self-dispersing pigment and the resin encapsulating a coloring material is 8 percent by weight based on the total weight of the ink, the resin encapsulating the coloring material being contained in a sufficient amount to provide rub-resistance to an image produced with the ink, wherein the ink provides an ink jet recorded image with a certain optical density that is equivalent to that produced with an ink containing the self-dispersing pigment as a sole colorant at the solid concentration of 8 percent, and wherein the encapsulated coloring material is an oil-soluble dye or a water-insoluble pigment.

2. The ink according to claim 1, wherein the self-dispersing pigment is a self-dispersing carbon black to the surface of which at least one hydrophilic group is bonded directly or through another atomic group.

3. The ink according to claim 2, wherein the hydrophilic group is anionic.

4. The ink according to claim 3, wherein the resin encapsulating a coloring material has an anionic hydrophilic group at the surface thereof.

5. The ink according to claim 2, wherein the hydrophilic group is cationic.

6. The ink according to claim 5, wherein the resin encapsulating a coloring material has a cationic hydrophilic group at the surface thereof.

7. The ink according to claim 2, further comprising a pigment dispersant having an anionic hydrophilic group when the hydrophilic group bonded to the surface of the self-dispersing carbon black is anionic.

8. The ink according to claim 2, further comprising a pigment dispersant having a cationic hydrophilic group when the hydrophilic group bonded to the surface of the self-dispersing carbon black is cationic.

9. An image recording process comprising the step of applying at least two color inks to a recording medium using an ink-jet method to form a multi-color image, wherein one ink is an ink according to claim 5 or 8, and the other ink comprises a compound having an anionic group.

10. An image recording apparatus, comprising:
ink containers containing first and second inks respectively, and a recording head for ejecting the respective inks, wherein the first ink is an ink according to claim 5 or 8, and the second ink is an anionic ink.

11. The ink according to claim 1, further comprising a pigment dispersant.

12. The ink, according to claim 1, wherein the pigment and the coloring material have the same color.

13. The ink according to claim 1, wherein the coloring material is encapsulated in a microcapsule made of the resin.

14. An ink cartridge, comprising an ink container containing an ink according to claim 1.

15. A recording unit, comprising:
an ink container containing an ink according to claim 1,
a recording head, and
means for feeding the ink from the ink container to the recording head.

16. An ink set comprising a first ink and a second ink in combination, wherein the first ink is an ink according to claim 1, and each of the first and second inks has a color selected from the group consisting of yellow, magenta, cyan, black, red, green and blue.

17. An image recording process, comprising the step of applying an ink according to claim 1 to a recording medium by an ink-jet process.

18. An image recording apparatus, comprising:
an ink container containing an ink according to claim 1; and
an ink-jet head for ejecting the ink.

* * * * *

UNITED STATES PATENT AND TRADEMARK OFFICE
CERTIFICATE OF CORRECTION

PATENT NO. : 6,790,878 B2
DATED : September 14, 2004
INVENTOR(S) : Kurabayashi

It is certified that error appears in the above-identified patent and that said Letters Patent is hereby corrected as shown below:

Title page,
Item [*] Notice, insert: -- This patent issued on a continued prosecution application filed under 37 CFR 1.53(d), and is subject to the twenty year patent term provisions of 35 U.S.C. 154(a)(2). --
Item [56], References Cited, FOREIGN PATENT DOCUMENTS,
"JP 9-183931    7/1997" should be deleted.
OTHER PUBLICATIONS, insert
-- English Translation of JP-A-9-227816 of September 2, 1997. --.

Column 2,
Line 53, "added" should read -- be added --.

Column 4,
Line 39, "add" should read -- be added --.

Column 5,
Line 27, "an ink, which" should read -- containing an ink, which --.

Column 6,
Line 48, "is easy" should read -- is easy to use --.
Line 51, "may" should read -- there may --.

Column 7,
Line 36, "Examples" should read -- As examples --.
Line 38, "may" should read -- there may --.

Column 8,
Line 41, "add" should read -- be added --.

Column 9,
Line 17, "tain" should read -- tains --.

Column 12,
Line 58, "black described" should read -- blacks described --.

Column 14,
Line 3, "After" should read -- After being --.

UNITED STATES PATENT AND TRADEMARK OFFICE
CERTIFICATE OF CORRECTION

PATENT NO. : 6,790,878 B2
DATED : September 14, 2004
INVENTOR(S) : Kurabayashi

It is certified that error appears in the above-identified patent and that said Letters Patent is hereby corrected as shown below:

Column 17,
Line 11, "may" should read -- there may --.

Column 18,
Line 7, "may" should read -- there may --.

Column 21,
Line 66, "pull" should read -- pulled --.

Column 22,
Line 12, "An" should read -- A --.
Line 15, "an" should read -- a --.
Line 56, "the" should read -- the requirements of --.

Column 25,
Line 12, "efection" should read -- ejection --.
Line 39, "the" should read -- the requirements of --.

Signed and Sealed this

First Day of February, 2005

JON W. DUDAS
*Director of the United States Patent and Trademark Office*